United States Patent [19]

Stocchi et al.

[11] 3,731,457

[45] May 8, 1973

[54] PROCESS FOR SCRUBBING GASES

[75] Inventors: Virgilio Stocchi, Mestie; Antonio Cavraro, Porto Marghera; Carlo Morsiani, Saronno; Dario Vio, Porto Marghera, all of Italy

[73] Assignee: Montecatini Edison S.p.A., Milan, Italy

[22] Filed: July 15, 1971

[21] Appl. No.: 163,032

Related U.S. Application Data

[62] Division of Ser. No. 873,822, Nov. 4, 1969, Pat. No. 3,611,592.

[30] Foreign Application Priority Data

Nov. 7, 1968   Italy..............................23393 A/68
Sept. 29, 1969   Italy..............................22639 A/69

[52] U.S. Cl.........................................55/64, 55/240
[51] Int. Cl...............................................B01d 53/00
[58] Field of Search...............55/63, 84, 90, 238, 55/240, 402, 464; 261/89, 108, 111, 113, 116

[56] References Cited

UNITED STATES PATENTS

| 2,213,267 | 9/1940 | Baumann et al | 55/63 |
| 2,894,603 | 7/1959 | Vasan | 55/63 X |
| 3,064,955 | 11/1962 | Boutte | 261/113 |
| R16,315 | 4/1926 | Senseman | 55/240 X |
| 1,848,334 | 3/1932 | Fedeler | 261/111 |
| 2,408,290 | 9/1946 | Byer | 261/108 |
| 3,439,477 | 4/1969 | Pyne et al | 261/89 X |
| 3,623,297 | 11/1971 | Barefoot | 261/116 X |
| 3,611,592 | 10/1971 | Stocchi et al | 55/240 |

Primary Examiner—Reuben Friedman
Assistant Examiner—R. W. Burks
Attorney—Hubbell, Cohen & Stiefel

[57] ABSTRACT

Scrubbing process for separating vapors, liquid and solid particles from gas by a scrubbing liquid. A spout directs a full stream of the scrubbing liquid at a grid which comprises a multiplicity of spaced apart rods for forming films of the scrubbing liquid. The plane of the grid is transversely disposed with respect to the gas stream to be purified. The gas stream is passed through the films of scrubbing liquid for cleaning.

1 Claim, 7 Drawing Figures

Patented May 8, 1973 3,731,457

Patented May 8, 1973 3,731,457

PROCESS FOR SCRUBBING GASES

CROSS-REFERENCE TO RELATED APPLICATION

This application is a division of co-pending application Ser. No. 873,822, filed Nov. 4, 1969 for Apparatus for Scrubbing Gases now U.S. Pat. No. 3,011,592.

BACKGROUND OF THE INVENTION

1. Field of the Invention

The present invention pertains to the field of scrubbing apparatuses and methods for removing vapors, liquid and solid particles from gases.

2. Description of the Prior Art

The problem of removing fine powders, smokes, vapors mists and the like from the gases discharged by industrial processes as well as the problem of purifying the gases obtained or employed in the chemical processes, has been recognized for a long time in the prior art. Many methods and apparatuses have been thus developed and improved, to the end of achieving better results as to the scrubbing efficiency and to the degree of removal of the fine particles dispersed in such gases. The most suitable operational conditions for the economy of the methods and apparatuses have been carefully examined but the problem has not yet been satisfactorily solved.

Among others, a typical problem that has to be faced in this art relates to the purification of acetylene gas obtained by pyrolysis of gaseous or liquid hydrocarbons, when the removal of carbon black particles contained therein is desired.

A similar problem is also met, for instance, in the purification of other industrial and waste gases, in order to avoid air pollution, in the recovery of chemicals dispersed or suspended in air or gaseous streams, in the separation of a gas contained in a gaseous mixture by absorption into a liquid, and so on.

However, all of the known scrubbing apparatuses possess various disadvantages, as for instance, the substantial pressure drop exhibited by the gaseous stream while flowing through such apparatuses. So far, this drawback has been overcome by suplying the scrubbing apparatuses with additional blowers. However, the use of those blowers results in other drawbacks. For example, if the blowers are not carefully regulated, which is costly, the pressure in the scrubber may rise sharply, to the detriment of the acetylene making process. Other well-known scrubbing apparatuses are the electrostatic filters which afford a low pressure drop in the gases to be purified. However, these apparatuses also possess several disadvantages. In fact, aside from the drawbacks of imposing heave service and maintenance conditions, these filters present, for instance in the case of acetylene production from liquid hydrocarbons, a possibility of explosion during idle periods.

SUMMARY OF THE INVENTION

We have now invented a scrubbing process for separating vapors, liquid and solid particles from gas by a scrubbing liquid, which comprises (1) a peripherally extending wall which defines a longitudinally extending chamber; (2) a grid disposed along a plane transversely of the longitudinal extent of the peripheral wall and comprising a multiplicity of spaced apart rods for forming films of the scrubbing liquid in the spaces between adjacent spaced apart rods; and (3) a spout for directing a full stream of the scrubbing liquid at the grid.

The gas to be treated is caused to flow in the same direction as or oppositely to the full stream of the scrubbing liquid. This liquid strikes the grid along a direction substantially perpendicular to the grid thus producing a liquid film substantially parallel to the grid and perpendicular to the flow direction of the gas. While passing through the liquid film, the liquid extracts the particles finely suspended or dispersed in the gas, as for example the carbon black particles contained in the raw gas obtained by pyrolysis of hydrocarbons. In this case, the energy necessary for extracting the particles, instead of being supplied by the gas to be treated, is provided by the scrubbing liquid. The stream ejected by the spout is full, i.e., is not atomized or finely divided. In fact, we have found that the scrubbing process of our invention is suitable for highly reducing, in comparison with the known scrubbing processes the pressure drop exhibited by the gaseous flow while passing through the scrubber, avoiding the need for blowers heretofore necessary to supply the gas with the energy sufficient to balance the pressure drop and thus overcoming all the drawbacks related to the use of such blowers.

We have found that the process of our invention allows high degree of scrubbing of the fine particles suspended or dispersed in the gas to be treated, as well as of vapors dissolved therein. Furthermore, this scrubbing action occurs in our scrubber under the safest operational conditions, without formation of any explosive mixture.

DESCRIPTION OF THE PREFERRED EMBODIMENTS

Figure 1:
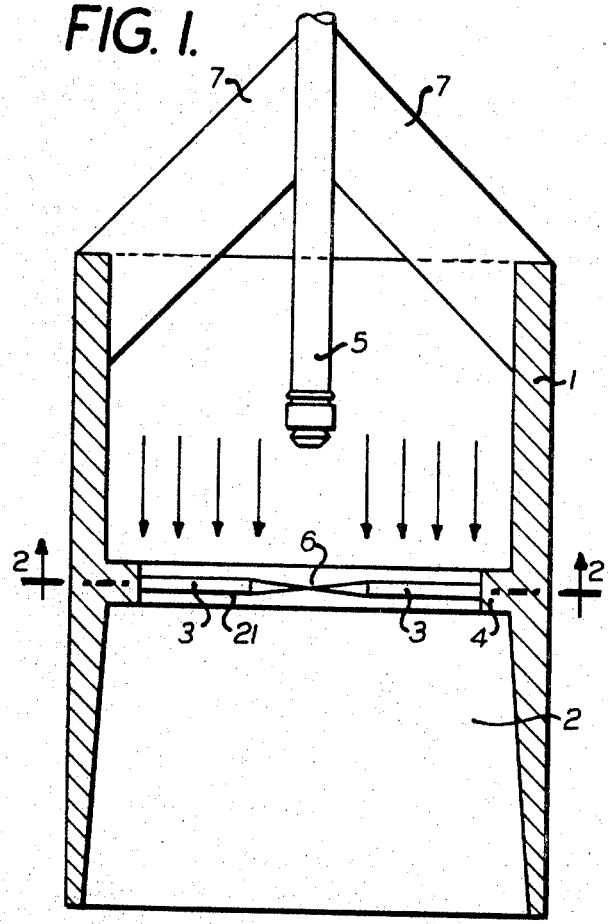
FIG. 1 is a longitudinal sectional view of a scrubbing apparatus in accordance with the present invention.

Referring now to the drawings in detail and particularly to FIGS. 1, 2, 3, and 4, a scrubbing apparatus is shown, the apparatus including a vertically extending, elongated cylindrical side wall 1 provided with a grid 21, preferably made up of a plurality of spoke-like elements 3. As shown and preferred the spoke-like elements (hereinbelow simply referred to as "spokes") extend horizontally and radially inward from a cylindrical boss 4 on wall 1, thus defining a plane which is substantially perpendicular to the vertical axis a—a of wall 1. The wall 1 defines a longitudinally extending chamber 2. As stated, spokes 3 are fastened to the wall 1 by means of an annular boss 4. Boss 4 is preferably removably attached to wall to facilitate the mounting and removal of said spokes 3. Said chamber 2 is further provided with spout 5, said spout being disposed therein and fastened thereto by means of suitable supports 7. The axis of spout 5 is preferably disposed on the axis a—a of the chamber 2. Spout 5 directs a full stream of a suitable scrubbing liquid, for instance, water, against grid 21. This stream of scrubbing liquid leaves nozzle 5 at a high velocity and strikes the center of the grid perpendicularly. Upon impinging on the grid center 6, the stream disperses or spreads out into a plurality of liquid films or laminae, each being substantially perpendicular to axis a—1 of chamber 2 and each extending between or bridging the space between adjacent spokes.

The gas to be purified is caused to flow in an axial direction inside chamber 2, thus perpendicularly impinging on the liquid films and giving over to the films the fine particles suspended or dispersed in the gas or vapors dissolved therein. As indicated by the arrows of FIG. 1, the gas to be treated is caused to flow in the same direction as the full stream of the scrubbing liquid ejected from spout 5.

Figure 3:
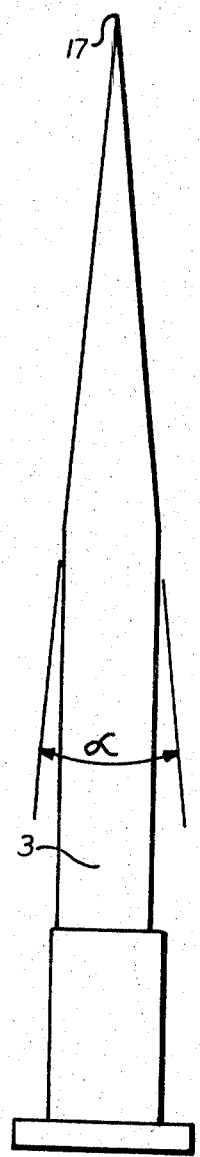
FIG. 3 is a plan view of a spoke used to form the grid of an apparatus in accordance with the present invention.
Figure 4:
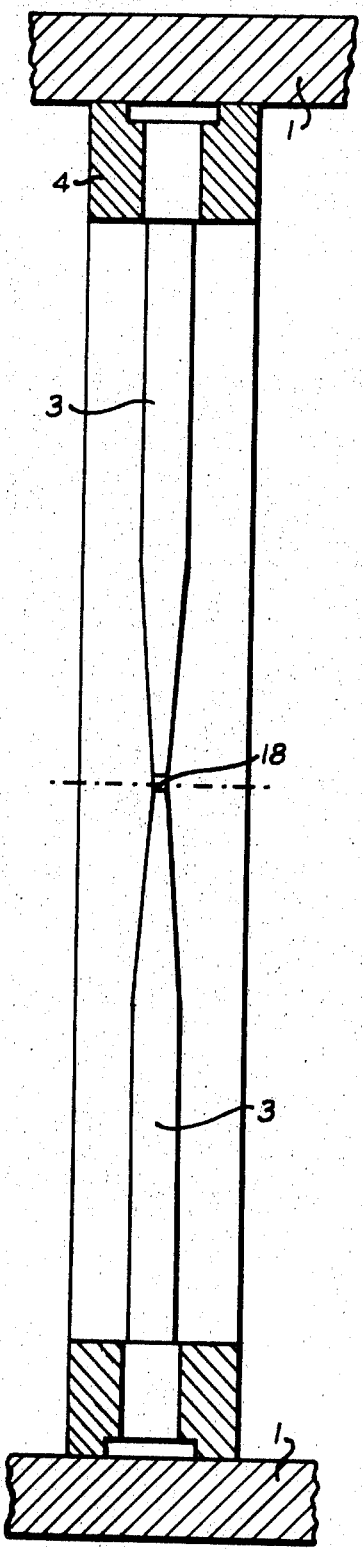
FIG. 4 is a sectional view taken along the line 4—4 of FIG. 2.

The scrubbing liquid that leaves the apparatus (through a liquid outlet that is not shown in FIG. 1) therefore holds the material taken away from the gaseous stream. As shown in FIGS. 3 and 4, each spoke 3 preferably has a circular cross section. In addition, each spoke has a tapered inner end 17.

The number of the spokes forming the grid can widely vary, depending on the dimensions of the scrubbing apparatus. The spoke length and its cross-section diameter can also vary within wide ranges as well as the width of the taper angle $\alpha$, which, however, is generally comprised between 5° and 13°. We have found that excellent results are obtained by means of a grid having a ratio between the solid section i.e., the area actually covered by spokes 3, and the void section, i.e., the area of the entire cross-section 2—2, smaller than 70 percent and preferably ranging between 20 and 70 percent. Grid 21 has a center 6 defined by the meeting point of the tapered ends 17 of the spokes 3 or it can be defined by a small cylinder 18 to which the tapered ends 17 of spokes 3 are fixed by suitable means. Although only one spout and only one grid are shown in the foregoing figures, it is however obvious that several spouts and several grids can be employed for the same apparatus, without departing from the spirit of our invention.

We have further found that the best results, particularly with regard to reducing pressure drop and to the scrubbing efficiency are obtained when the apparatus has the hereinbelow defined "covering " of the spout on the impact surface," smaller than 100 percent and preferably comprised between 30 percent and 85 percent.

By "covering of the spout on the impact surface," we mean the percentage ratio between the impact surface which is really impacted by the full stream of liquid, $s$, and the projection of this stream on the plane of said impact surface, $S$, which projection coincides with the cross section surface of the full stream of liquid.

Figure 2:
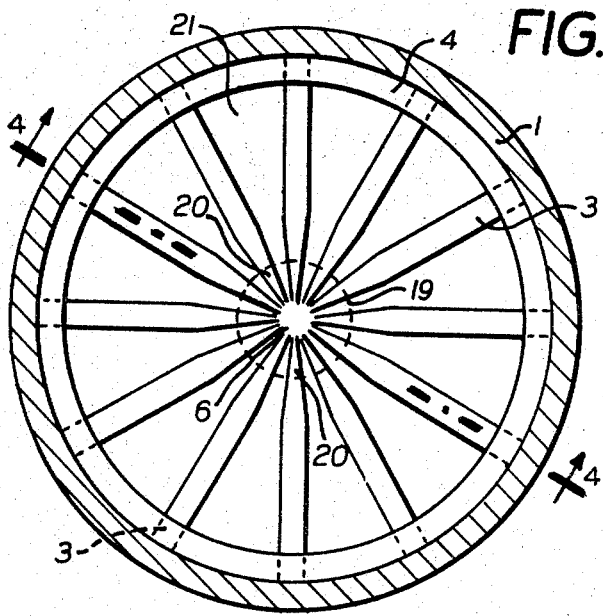
FIG. 2 is a sectional view taken along the lines 2—2 of FIG. 1.
Figure 7:
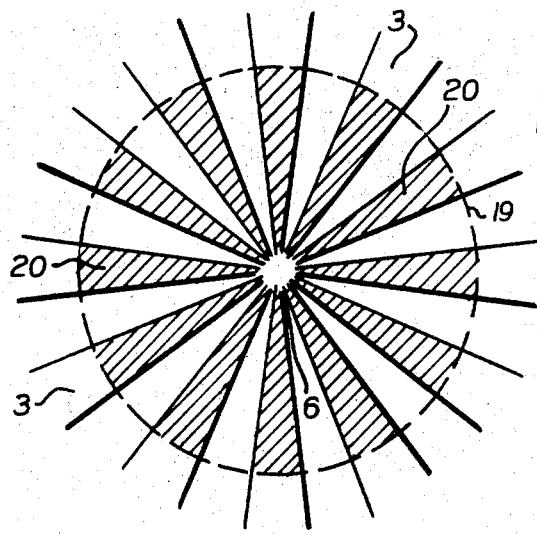
FIG. 7 is an enlarged fragmentary view showing the central portion of FIG. 2.

As shown in FIGS. 2 and 7, circle 19 defines the area of impact of the stream with the plane of grid 21. The portion of the plane of grid 21 actually impacted by the full stream of liquid is the sum of all the triangles 20 which are within said circle 19. The "covering of the spout on the impact surface" above referred to is thus given by the expression $(s/S) \times 100$.

As previously stated, the gas to be purified is caused to flow either in the same direction as or oppositely to the full stream of scrubbing liquid injected by the spout 5. The velocity of the gas, measured at the grid, generally ranges between about 30 and 50 m/sec. According to the kind and the flow rate of the gas to be treated, the apparatus of this invention can be utilized alone or in connection with other already known scrubbing apparatuses, or several apparatuses of the present invention can be utilized at the same time by connecting them within the same tower in parallel for increasing their flow rate, or in series for increasing their efficiency, as will be more fully described subsequently.

Furthermore, we have experimentally found a relationship between the scrubbing efficiency achieved by the apparatus of our invention and the specific consumption of the scrubbing liquid. The relationship can be expressed as follows:

$$\% \text{ Efficiency} = \frac{P_u}{P_i}$$

$$= \frac{A}{(1+\frac{m}{G}H\beta^2\gamma)_1 \times (1+\frac{m}{G}H\beta^2\gamma)_2 \times \ldots (1+\frac{m}{G}H\beta^2\gamma)_n} \times 100$$

wherein: indexes 1, 2 ..., $n$ refer to the number of stages; $P_i$ is the concentration (in mg/Nm$^3$) of the material to be scrubbed off e.g. carbon particles); $P_u$ is the concentration (in mg/Nm$^3$) of the particulate material still remaining if the gas leaving the apparatus; $m/G$ is the specific consumption (in Kg/Nm$^3$) of the scrubbing liquid per volume unit of the treated gas; H stands for the specific energy of the full stream (in Kgm/kg.); $\beta$ is a constant depending on the features of the spout; $\gamma$ is a constant depending on the kind of material to be scrubbed off from the gas (dimensions of the particles, their wettability, composition, etc.), (in Nm$^3$/kgm); A is a constant depending on the type of apparatus (number of spokes, shape of spokes and so on). The expression $(1 + m/G \cdot H \cdot \beta^2 \cdot \gamma)$ is to be calculated for each stage. As used herein the term "stage" means the step in which the gas is scrubbed in one apparatus of the invention or in more than one apparatus of the invention but connected in parallel, as will be more fully understood subsequently.

Figure 5:
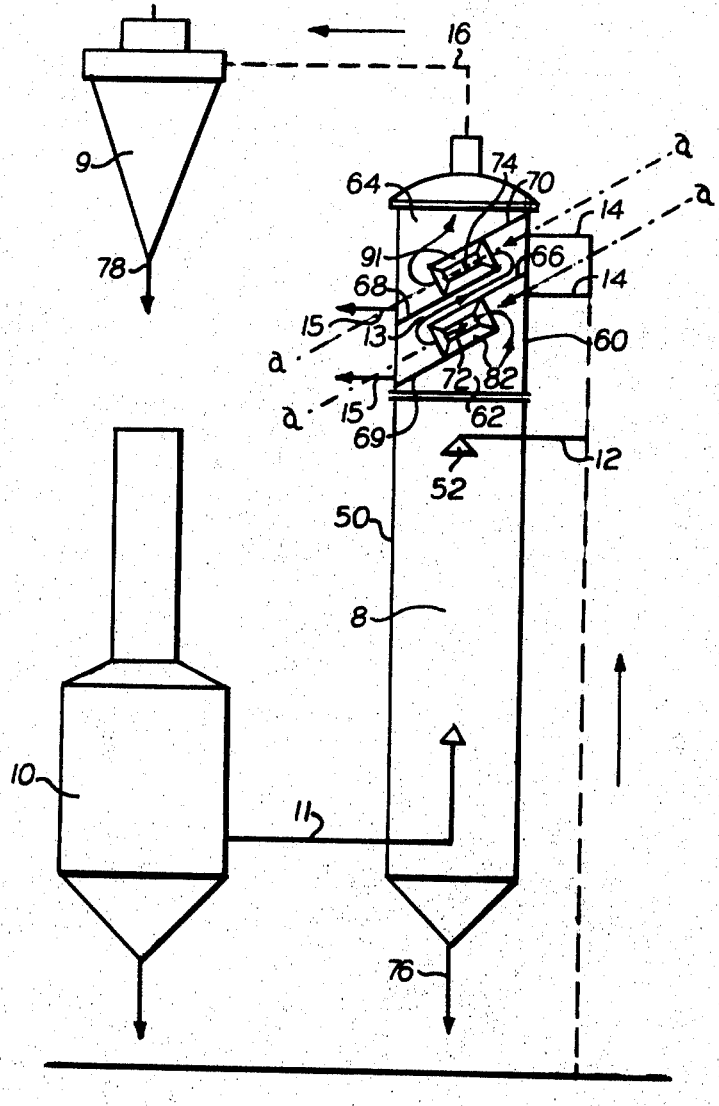
FIG. 5 is a diagrammatic illustration of a plant for producing acetylene by hydrocarbon pyrolysis, including scrubbing apparatuses in accordance with the present invention.

Referring now to FIG. 5, a plant for producing clean acetylene is diagrammatically illustrated. The plant includes a reactor 10 for producing acetylene from hydrocarbons which reactor is well known in the prior art, a cooling-scrubbing tower 8 having a cooling section 50 and a scrubbing section 60, the latter being stacked or superimposed on top of the former. In addition, the plant of FIG. 5 includes a separator 9 for removing any entrained water particles from the acetylene gas being treated.

More specifically, and as shown in FIG. 5, the reactor 10 is connected to the bottom of the tower 8 (especially to the bottom of the cooling section 50 of said tower) by means of a duct or pipe 11 for introducing acetylene into the bottom of the tower). Neat the top of the cooling section 50 of the tower 8 is a nozzle 52 for introducing in a downward direction a cooling liquid such as water supplied to the nozzle by a water pipe 12. Thus, as the acetylene moves upwardly through the cooling portion 50 of the tower 8 its temperature will be reduced and there will be some incidental scrubbing.

As already noted, a scrubbing section 60 of tower 8 is stacked on top of the cooling section 50. As shown in FIG. 5, the scrubbing section 60 is made of two scrubbing stages 62 and 64, each of them here shown as including one apparatus 82 and 91 in accordance with the present invention as shown in FIG. 1. The apparatuses are connected in series by means of baffles 66, 68, 69 and 70. As shown the apparatuses are all disposed at an angle to the horizontal although other arrangements may be employed. The grids 72 and 74 of the two series connected scrubbing apparatuses are both arranged perpendicular to the axis a—a of the apparatuses 82 and 91. Each of them is constructed substantially the same as a grid 21 of FIG. 1. As shown, each of the apparatuses is provided with a spout 14 which is adapted to direct a full stream of water at their respective grids 72 and 74 and in a direction substantially perpendicular to the plane of the grids. As shown in FIG. 1, it will be noted from the serpentine arrowed line running through the drawing of the two scrubbing stages that the acetylene gas to be scrubbed impinges the grids 72 and 74 in the same direction as the streams from the spouts 14.

Each of the stages 62 and 64 operate substantially identically to the scrubber of FIG. 1. Thus an increased amount of particulate material and gas vapors can be removed from the acetylene through the series connected two-stage arrangement of FIG. 5 as the relatively clean acetylene leaving the lower stage 62 is scrubbed a second time in the upper stage 64 to thereby have the gas existing from the tower 8 through the duct 16 in a very clean or pure condition. Desirably the twice scrubbed gas leaves the tower 8 through a duct 16 and is then subjected to the action of a suitable separator 9 which is a cyclone or centrifugal separator, for removing any entrained water particles. Such water particles can be drained from the separator 9 through a drain 78.

It will be obvious from a perusal of FIG. 5 that the cooling water can be removed from the cooling section 50 by a drain 76 at the bottom of the tower 8 and the scrubbing water introduced by the spouts 14 in both the lower and upper scrubber sections can be removed by drains 15 near the bottom of the baffle plates 68 and 69.

In a test run of the apparatus of FIG. 5, 1,400 Nm³/h of raw acetylene obtained by pyrolysis of methane in reactor 10, and having carbon black content of 950 mg/Nm³, were passed through column 8. In each stage the pressure of the scrubbing water was 25 kg/cm², its flow rate 4.5 m³/h and the velocity of the full stream of water about 65 m/sec; the void section of the grid was 300 cm², the number of the grid spokes 24, each spoke having a diameter of 8 mm. and taper angle α of 10°; the ratio between the solid and the void section of the grid was about 50 percent. The "covering of the spout on the impact surface" was about 65 percent.

A 250 mg/Nm³ content of carbon black was detected at the gas outlet from the first stage while a content of carbon black of 65 mg/Nm³ was measured at the gas outlet from the second stage. The total pressure drop suffered by the gas through both stages was of 60 mm of water.

In another test run of the apparatus of the same FIG. 5, 1,400 Nm³/h of raw acetylene obtained by pyrolysis of methane in reactor 10, and having carbon black content of 950 mg/Nm³, were passed through column 8. In each stage the pressure of the scrubbing water was 25 kg/cm², its flow rate 4,5 m³/ h and the velocity of the full stream of water about 65 m/sec; the void section of the grid was 300 cm², the number of the grid spokes 24, each spoke having a diameter of 14 mm. and taper angle α of 13°; the ratio between the solid and the void section of the grid was about 70 percent. The "covering of the spout on the impact surface" was about 85 percent.

A 250 mg/Nm³ content of carbon black was detected at the gas outlet from the first stage while a content of a carbon black of 90 mg/Nm³ was measured at the gas outlet from the second stage. The total pressure drop suffered by the gas through both stages was less than 1,000 mm of water.

In a further test run of the apparatus of the same FIG. 5, 1,400 Nm³/h of raw acetylene obtained by pyrolysis of methane in reactor 10, and having carbon black content of 950 mg/Nm³, were passed through column 8. In each stage the pressure of the scrubbing water was 25 kg/cm², its flow rate 4,5 m³/h and the velocity of the full stream of water about 65 m/sec; the void section of the grid was 300 cm², the number of the grid spokes 24, each spoke having a diameter of 4 mm. and taper angle α of 5°; the ratio between the solid and the void section of the grid was about 20 percent. The "covering of the spout on the impact surface" was about 30 percent.

A 250 mg/Nm³ content of carbon black was detected at the gas outlet from the first stage while a content of carbon black of 120 mg/Nm³ was measured at the gas outlet from the second stage. The total pressure drop suffered by the gas through both stages was less than 20 mm of water.

As previously stated, to increase scrubbing efficiency, two or more scrubbing devices can be connected in series; to increase scrubbing capacity two or more scrubbing devices can be connected in parallel. Clearly, arrangements can be desirably made in which a plurality of scrubbing devices are arranged in a plurality of series connected stages, each stage comprising a plurality of parallel scrubbing devices. Such an arrangement, which displays both an increase in efficiency and in capacity, is shown in FIG. 6.

Figure 6:
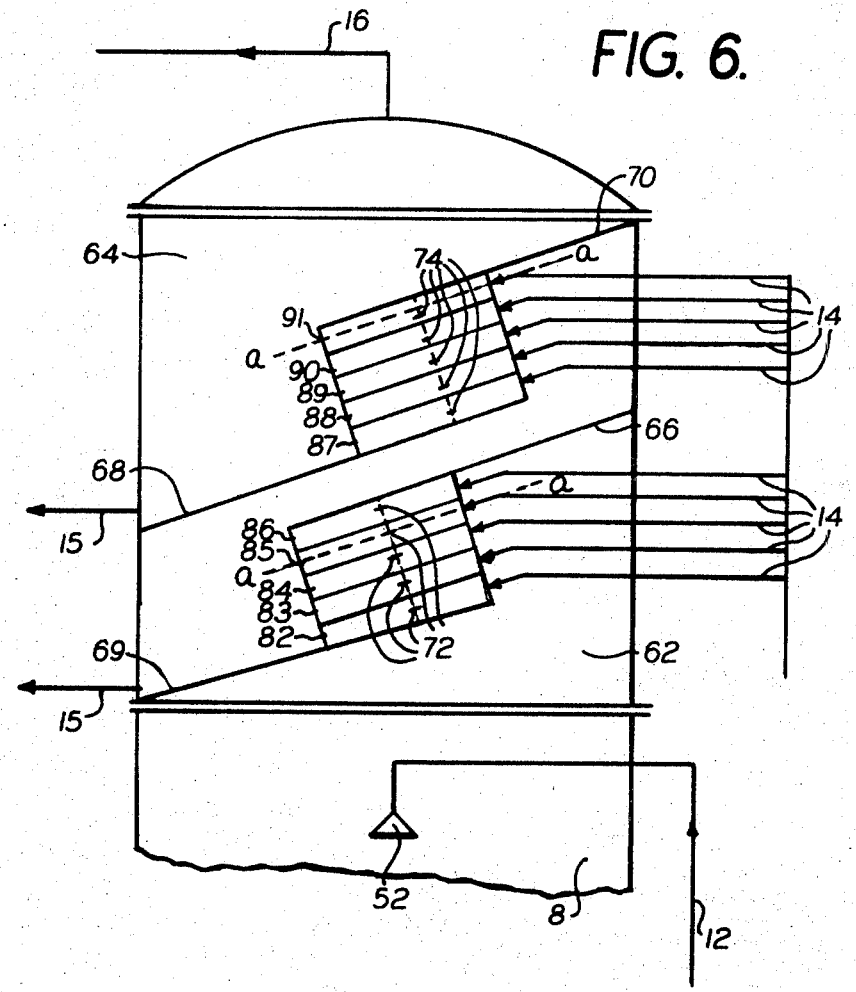
FIG. 6 is a fragmentary view of the upper portion of cooling-scrubbing tower embodying the present invention.

Referring now to FIG. 6, a fragmentary view of the upper portion of a cooling-scrubbing tower 8 is shown. The scrubbing section 60 is made of two series connected scrubbing stages 62 and 64, each of which consists of five parallel connected apparatuses of the invention which apparatuses are designated 82, 83, 84, 85 and 86; and 87, 88, 89, 90 and 91, respectively. The two stages of parallel connected apparatuses are connected in series by means of baffles 66, 68, 69 and 70 as in FIG. 5. The apparatuses are all disposed at an angle to the horizontal. The grids 72 and 74 are constructed the same as grid 21 of FIG. 1 and are arranged perpendicular to the axis a—a of apparatuses 82, 83, 84, 85, 86, 87, 88, 89, 90 and 91. As shown, each of the ten apparatus is provided with a spout 14, which directs full stream of water at their respective grids, in a direction substantially perpendicular to the plane of the grids.

Similar to the construction of FIG. 5, the acetylene gas to be purified impinges against the grids in the same direction as the stream from the spouts 14. In one experimental run of the apparatus of FIG. 6, 7,500 Nm³/h of raw acetylene obtained by pyrolysis of methane and having carbon black content of 1,000 mg/Nm³, were passed through column 8. In each stage the pressure and the flow rate of the scrubbing water were 25 kg/cm², 24 m³/h respectively (in all for the five apparatuses) and the velocity of the full stream of water about 65 m/sec; the total water flow rate was 48 m³/h for both stages.

In each apparatus the void section of the grid was 300 cm², the number of spokes 24, each spoke having a diameter of 6 mm and taper angle $\alpha$ of 8°; the ratio between the solid and the void section of the grid was 35 percent. The "covering of the spout on the impact surface" is about 55 percent.

A carbon black content of about 200 mg/Nm³ was detected at the gas outlet of the first stage while a content of about 50 mg/Nm³ was measured at the outlet of the second stage.

The total pressure drop suffered by the gas through both stages was less than 50 mm of water.

In another experimental run of the apparatus of FIG. 6, 12,500 Nm³/h of raw acetylene obtained by pyrolysis of petrol and having carbon black content of 3,500 mg/Nm³, were passed through column 8. In each stage the pressure and the flow rate of the scrubbing water were 25 kg/cm², 40 m³/h respectively (in all for the five apparatuses) and the velocity of the full stream of water about 65 m/sec; the total flow rate was 80 m³/h for both stages.

In each apparatus the void section of the grid was 300 cm², the number of spokes 24, each spoke having a diameter of 8 mm and taper angle $\alpha$ of 10°; the ratio between the solid and the void section of the grid was 50 percent. The "covering of the spout on the impact surface" is about 65 percent.

A carbon black content of about 10 mg/Nm³ was measured at the gas outlet of the second stage.

The total pressure drop suffered by the gas through both stages was about 360 mm of water.

The advantages of the present invention, clearly evidenced by the above description and examples, can be summarized as follows: low pressure drop and high scrubbing efficiency, as have been discussed; construction simplicity due to the reduction in required pumping or blower apparatuses and controls therefor; and low services cost which is expected from the reduction in blower apparatuses and related controls.

Modifications and variations can, of course, be made without departing from the spirit and scope of this invention.

Having thus described our invention, what we desire to secure by Letters Patent and hereby claim is:

1. A process for purifying raw acetylene produced by pyrolysis of hydrocarbons, comprising the steps of
   forming in spaces between spaced apart radially extending rods of a grid-like structure films of scrubbing liquid; and
   passing said raw acetylene through said films.

* * * * *